United States Patent
Buhles, Jr.

[15] 3,675,828
[45] July 11, 1972

[54] DISPENSING MACHINE

[72] Inventor: Herman Buhles, Jr., 880 N.E. 42nd Street, Fort Lauderdale, Fla. 33308

[22] Filed: June 1, 1970

[21] Appl. No.: 42,403

[52] U.S. Cl. ............................................................222/362
[51] Int. Cl. ..........................................................G01f 11/10
[58] Field of Search ..........................................221/127, 128; 222/138–141, 362, 135–137, 144.5

[56] References Cited

UNITED STATES PATENTS

| | | | |
|---|---|---|---|
| 3,129,853 | 4/1964 | Hoskins | 222/362 X |
| 2,616,591 | 11/1952 | Haugen | 222/141 |
| 2,892,461 | 6/1959 | Abercrombie | 221/128 X |
| 1,012,439 | 12/1911 | Rehfuss | 222/362 X |

Primary Examiner—Samuel F. Coleman
Attorney—Eugene F. Malin

[57] ABSTRACT

A dispensing machine including a rotatable, manually operated handle, a shaft connected to the handle, a movable upper plate connected to the shaft, topless-bottomless measuring containers connected below and adjacent openings in the upper plate, bins with hoppers above the measuring containers, a fixed bottom plate positioned immediately below the measuring containers, a chute below and adjacent to a cut away portion in the bottom plate, and a stop mechanism connected to the shaft to prevent the measuring containers from being placed beneath more than a single hopper.

2 Claims, 3 Drawing Figures

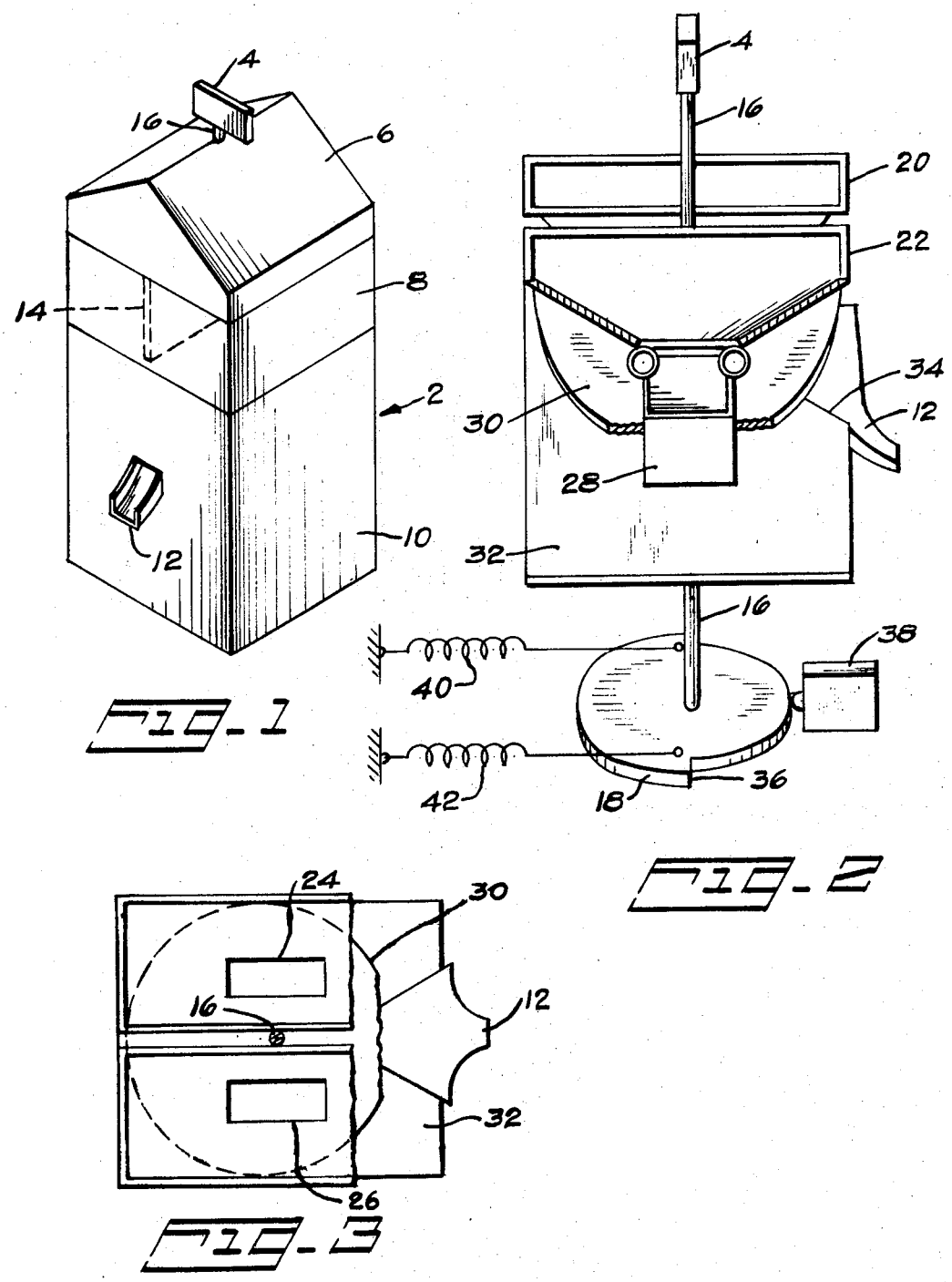

DISPENSING MACHINE

BACKGROUND OF THE INVENTION

This invention relates to a new and improved rotatable, manually operated dispensing machine, and, more particularly, to a dispensing machine for dispensing known quantities of articles by rotating a handle.

As is perhaps well-known, manually operated dispensing machines for dispensing nuts and other items have been complex in design. Various trap doors have been used in designing the measuring containers in order to construct a dispensing machine of relatively small width. Such manually operated machines are relatively expensive. Automatic coin operated dispensing machines require additional mechanisms, more counter space, and are more expensive than the manual dispensing machines.

SUMMARY OF THE INVENTION

The present invention relates to an improved manually operated dispensing machine, including bins to store the articles to be dispensed, hoppers below the bins, a rotatable handle that is operable from outside the machine housing, a shaft connected to the manually operated handle, measuring containers connected to the shaft, and a chute to allow the measured quantities of the articles to be dispensed outside the machine when the handle is rotated. The dispensing machine includes an upper plate connected to the shaft with the open topped measuring containers attached below and adjacent openings in the upper plate. The handle rotates each measuring container back and forth across the opening in the bottom of each hopper in order to fill each container. The measuring containers are open bottomed. A fixed plate is connected to the machine housing and positioned immediately below the movable measuring bins. The bottom edge of the container walls slide over the fixed plate. The fixed plate prevents the articles in the measuring container from falling out of the measuring containers. The fixed plate has an opening, or dumping slot, therein. The chute is positioned below and adjacent the dumping slot. As the measuring containers move over a dumping slot the articles fall into the chute and are dispensed outside the machine. The handle is rotated between fixed stop positions to prevent mixing of articles in different bins. Biasing means are connected to the handle and shaft to return the empty measuring containers to filling position beneath the hopper opening.

It is an object of this invention to provide a dispensing machine that is manually operated to move a plurality of measuring containers back and forth in an arc in order to provide a dispensing machine with a relatively narrow width.

It is a further object of this invention to provide a compact manually operated dispensing machine having measuring containers with open bottoms.

An additional object of this invention is to provide a relatively inexpensive dispensing machine.

In accordance with these and other objects which will be apparent hereinafter, the instant invention will now be described with particular reference to the accompanying drawing.

BRIEF DESCRIPTION OF THE DRAWING

In the drawing:

FIG. 1, is a perspective view of the dispensing machine;

FIG. 2, is a side view of the inner members of the dispensing machine with the machine titled toward the viewer, with portions cut away in order to show the top and side of various members; and FIG. 3, is a top view of the inner members shown in FIG. 2, partially cut away.

DESCRIPTION OF THE PREFERRED EMBODIMENT

Referring now in detail to the drawing, wherein an embodiment of the invention is shown, and referring, particularly, to FIG. 1, the dispensing machine is generally designated by numeral 2. The manually operated handle 4 projects above the roof 6 of the housing. An intermediate portion of the housing is transparent and allows a purchaser to view the articles in the housing. The bottom portion 10 of the dispensing machine 12 has an opening therein with a chute 12 projecting therefrom. The handle 4 is rotated in either direction to dispense articles, such as peanuts, out the chute 12. When the handle is rotated counterclockwise the articles placed in the housing to the left of the partition or separator 14 are dispensed out of the housing by chute 12. When the handle is rotated clockwise the articles placed in the housing to the right of partition or separator 14 are dispensed out the housing by chute 12.

Referring now to FIG. 2, the handle 4 is connected to a shaft 16 that extends downward to the bottom control plate 18. The shaft 16 may be supported by a member, not shown, between plate 18 and lower plate 32 for added stability. The hoppers 20 and 22 are placed on each side of separator 14 in the housing to dispense the articles in each bin. The side walls of each hopper slope downwardly toward openings 24 and 26 in the bottom of each hopper, as shown in FIG. 3. The articles or nuts in the hopper flow down into measuring containers, one of which is illustrated at numeral 28 with spring means along the top edge of the chamber. The measuring containers are fixedly connected to shaft 16 by means of upper plate 30. The measuring containers include four side walls having their upper edges connected to the rotatable upper plate 30. The measuring containers therefore lie below the openings in the upper plate. The shaft 16 is connected to the plate 30. When handle 4 is rotated, plate 30 rotates the measuring containers. The measuring containers are bottomless. The lower or bottom plate 32 is fixedly connected to the housing. As the lower edge of the measuring container walls slide over plate 32 the articles are held in the measuring containers by the bottom plate 32. The plate 32 is cut away at a dumping slot, shown at 34. The chute 12 is placed below the dumping slot. When the measuring containers pass over the dumping slot, the articles drop into the chute to be transported out the dispensing machine.

The shaft 16 is connected to control plate 18. One stop member is shown as 36. The stop member may be a cut out portion in the control plate 18 or may be a partially punched out portion of the control plate 18. A biased plunger mechanism 38 is fixed to the housing and engages the control plate 18 to control the limits of rotation of handle 4 in order to prevent each measuring container from passing under more than one hopper. Spring 40 and 42 may be connected between the housing and the control plate to bias the measuring containers into a filling position beneath the hoppers after each dumping operation. When partially punched out portions are used as stop members the plunger mechanism 38 may be placed beneath the control plate 18. When return springs are not used a midpoint hole may be drilled into the control plate to provide means for locking the handle 4 in a position for filling the hoppers.

Heaters may be placed under the lower plate 32 adjacent the hopper filling positions in order to heat the hot nuts.

The machine may include an adjustable member, not shown, including a horizontal plate to cover a portion of each measuring container and a vertical plate to be placed in the measuring container to reduce its carrying capacity. The adjustable member is connected to the upper plate 30 adjacent the measuring container to vary the capacity of the measuring container.

The instant invention has been shown and described herein in what is considered to be the most practical and preferred embodiment. It is recognized, however, that departures may be made therefrom within the scope of the invention. Therefore, the instant invention is not to be limited to the details discussed herein but to be accorded the full scope of the claims so as to embrace any and all equivalent apparatus and articles.

What is claimed is:

1. A dispensing machine comprising:

a pair of hoppers, each having a plurality of sides coupled together and tapered from a larger top opening to a smaller bottom opening, said hoppers disposed adjacent each other in a side by side relationship separated by a predetermined distance;

a frame coupled to said hoppers for supporting said hoppers above a surface;

a rotatable plate coupled in a plane to lie adjacent said hopper bottom openings to cover said bottom openings in a first rotatable position, said plate having a first plate opening and a second plate opening, each sized equal to and aligned adjacent to said hopper bottom openings in a second rotatable position;

a pair of measuring chambers, each having a plurality of sides coupled together, said chambers, each having an open top and an open bottom defined by said coupled sides, the top of each of said measuring chambers coupled to said rotatable plate in line with said first plate opening and said second plate opening respectfully and moveable with said rotatable plate;

a fixed plate coupled to said frame, the bottom ends of said measuring chambers lying flushly against said fixed plate upper surface; said fixed plate having a cut-out portion forming an aperture in said fixed plate;

a dispensing chute coupled to said fixed plate beneath said fixed plate aperture and to said frame;

a control shaft vertically dispensed above and between said pair of side-by-side hoppers and fixedly coupled to said rotatable plate so that twisting of said shaft will rotate said rotatable plate and one of said measuring chambers over said fixed plate aperture;

a handle coupled to the top end of said shaft;

a disk-shaped guide plate having a substantially circular circumference, a first portion having a larger radius than a second portion, said guide plate fixedly coupled to said shaft; and a guide plate stopping member adjacent said second smaller guide plate circumference portion and engagable with end portions of said larger guide plate circumference to limit the rotatable limits of said shaft whereby each of said measuring chambers stop over said fixed plate aperture.

2. A dispensing machine as in claim 1, including:

a pair of springs coupled diametrically across said guide plate at first ends and coupled to said frame at opposite ends.

* * * * *